US012377342B2

(12) United States Patent
Yarro

(10) Patent No.: US 12,377,342 B2
(45) Date of Patent: Aug. 5, 2025

(54) DICE SPINNER

(71) Applicant: Yarro Studios, Inc., Orem, UT (US)

(72) Inventor: Tanner Yarro, Provo, UT (US)

(73) Assignee: Yarro Studios, Inc., Orem, UT (US)

( * ) Notice: Subject to any disclaimer, the term of this patent is extended or adjusted under 35 U.S.C. 154(b) by 0 days.

(21) Appl. No.: 18/382,976

(22) Filed: Oct. 23, 2023

(65) Prior Publication Data

US 2024/0299837 A1 Sep. 12, 2024

Related U.S. Application Data

(60) Provisional application No. 63/451,304, filed on Mar. 10, 2023, provisional application No. 63/455,332, filed on Mar. 29, 2023.

(51) Int. Cl.
*A63F 9/04* (2006.01)
*A63F 9/00* (2006.01)
*B43K 29/00* (2006.01)

(52) U.S. Cl.
CPC ............ *A63F 9/0406* (2013.01); *A63F 9/001* (2013.01); *A63F 9/0415* (2013.01); *B43K 29/002* (2013.01)

(58) Field of Classification Search
CPC ...... A63F 9/0406; A63F 9/001; A63F 9/0415; A63F 5/048; B43K 29/002
See application file for complete search history.

(56) References Cited

U.S. PATENT DOCUMENTS

| | | | | |
|---|---|---|---|---|
| 592,087 | A * | 10/1897 | French | A63F 5/048 273/142 H |
| 2,208,351 | A * | 7/1940 | Von Berg | A63F 5/0094 273/142 H |
| 3,457,720 | A * | 7/1969 | Bachmann | G04F 7/0842 368/106 |
| 2011/0028197 | A1 * | 2/2011 | Marquez | A63F 5/00 463/25 |
| 2021/0058689 | A1 * | 2/2021 | Grant | H04R 1/026 |

OTHER PUBLICATIONS

“1920s Demley Auto-Dice Mechanical Pocket Dice” uploaded by Gadgetify on Oct. 16, 2019 at https://www.youtube.com/watch?v=ITWwaY71LZk (Year: 2019).*
“The First D20 Mechanical Dice Spinner” published by Yarro Studios at https://www.youtube.com/watch?v=xiu2Sr3_zqk (Year: 2023).*

(Continued)

*Primary Examiner* — Michael D Dennis
(74) *Attorney, Agent, or Firm* — DENTONS Durham Jones Pinegar

(57) ABSTRACT

This disclosure relates generally to gaming equipment and/or accessories, such as dice and dice spinners. In various aspects, disclosed dice spinners include a housing having a top and a bottom, the top defining one or more windows, and a spinner housed within the housing, the spinner having a locking mechanism and at least one dice disk. Disclosed dice spinners may further include a crown in mechanical communication with the spinner such that applying pressure to the crown causes the spinner to spin and display one or more numbers through the one or more windows of the housing.

19 Claims, 11 Drawing Sheets

(56) References Cited

OTHER PUBLICATIONS

Video published by unrollydice at https://www.tiktok.com/@unrollydice/video/7300233764393733407 (Year: 2023).*
Website publication—http://www.mi-me.de/weitere-spielideen.html (Year: 2024).*
Nice Antique 1920's Art Deco Demley NY Mechanical "Auto-Dice" Pocket Game-Works, retrieved from internet https://www.ebay.com/itm/355277468602, accessed Jan. 22, 2024.

* cited by examiner

DICE SPINNER

CROSS REFERENCE TO RELATED APPLICATION

A claim for priority to the Mar. 10, 2023 filing date of U.S. Provisional Patent Application No. 63/451,304, titled DICE SPINNER (the "'304 Provisional Application") as well as the Mar. 29, 2023 filing date of U.S. Provisional Patent Application No. 63/455,332 titled DICE PEN (the "'332 Provisional Application"), is hereby made pursuant to 35 U.S.C. § 119(e). The entire disclosure of the '304 Provisional Application and the '332 Provisional Application are incorporated herein by reference.

TECHNICAL FIELD

This disclosure relates generally to games and gaming equipment, such as dice and dice spinners. More specifically, to a device for spinning a disk or a plurality of disks to be used in a game that involves chance or other game or games such as Dungeons and Dragons ("D&D"). The features disclosed herein may be numerous in nature and may be employed in various different ways to provide the same or similar results. The following description may refer to the design flat housing shaped spinner or a pen like apparatus all of which refer to the same element or mechanics in its use.

SUMMARY

Disclosed are systems, devices, and/or methods of use thereof regarding gaming equipment and/or accessories, such as dice and dice spinners. In various aspects, disclosed dice spinners include a housing having a top and a bottom, the top defining one or more windows, and a spinner housed within the housing, the spinner having a locking mechanism and at least one dice disk. Disclosed dice spinners may further include a crown in mechanical communication with the spinner such that applying pressure to the crown causes the spinner to spin and display one or more numbers through the one or more windows of the housing.

In some embodiments, disclosed dice spinners may include a housing having a top and a bottom, with the top defining one or more windows. The dice spinners may further include a first spinner housed within the housing, the first spinner including a locking mechanism, a platform disposed over a portion of the locking mechanism, and a dice disk disposed on the platform. In some embodiments, dice spinners also include a crown in mechanical communication with the locking mechanism such that applying pressure to the crown causes the locking mechanism to disengage the platform, allowing the platform and the dice disk to spin.

Other aspects of the disclosed subject matter, as well as features and advantages of various aspects of the disclosed subject matter, should be apparent to those of ordinary skill in the art through consideration of the ensuing description, the accompanying drawings, and the appended claims.

DETAILED DESCRIPTION

Figure 1:
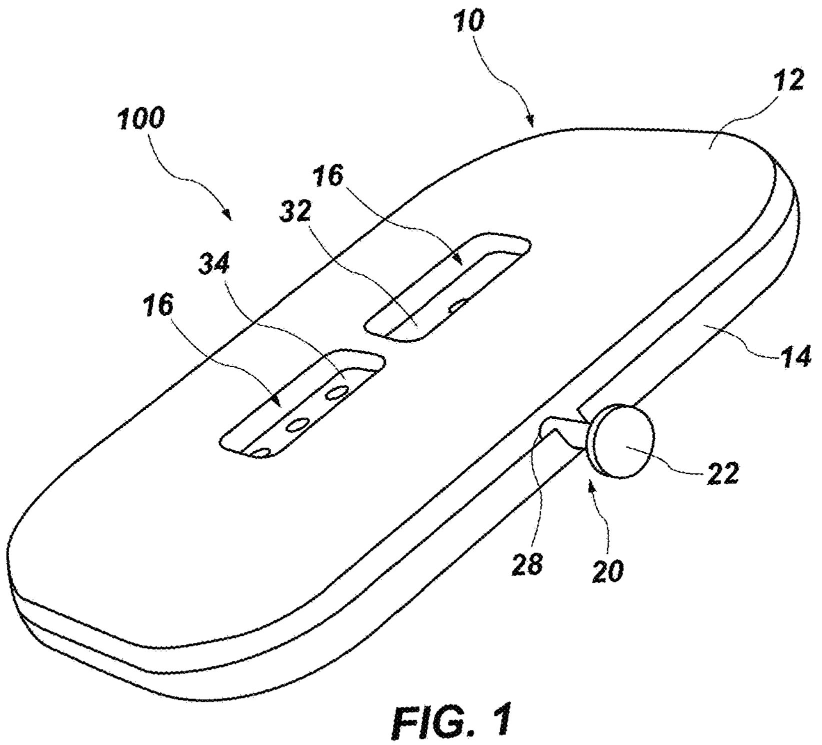
FIG. 1 illustrates a top, perspective view of a dice spinner according to the present disclosure.

Humans are playful animals and, generally, enjoy playing games as part of social activities. Many games may be played with relatively few/simple components, such as a deck of cards. Some games are more intensive and require extensive equipment, such as boards, playing pieces, cards, etc. Other games utilize few components (e.g., cards), heavily incorporate elements of the imagination (e.g., setting, back story, characters, etc.), and are played on a tabletop. For example, role-playing games (RPG), such as Dungeons and Dragons® (D&D), require players to develop a backstory and abilities for their characters. The players (and their characters) then work together to accomplish a goal, go on a quest, etc.

Often, RPGs still involve game pieces to determine a player's or character's moves, lives, fire power, accuracy, etc. For example, dice are often used in D&D to determine who strikes first, how accurate the strike is, and how powerful the defense is. Dice are similarly used in games like Risk®. Dice are also often used in board games to determine how far a player can advance, among other things.

In using dice, a player typically shakes them up in a cup or their hand, and then throws the dice in the playing arena to see what numbers are generated. Importantly, dice are generally considered to generate random combinations of numbers.

Disclosed are systems, devices, and/or methods of use thereof regarding gaming equipment and/or accessories, such as dice and dice spinners which may include a long tubular like spinner or a flat planer like spinner. In various aspects, disclosed dice spinners include a housing defining one or more windows, and a spinner housed within the housing, the spinner having a locking mechanism and at least one dice disk. In some embodiments, the at least one dice disk includes or bears indicia, corresponding to a numerical value. Disclosed dice spinners may further include a crown, or button, in mechanical communication with the spinner such that applying pressure to the crown causes the spinner, or spinners, to spin. Upon release of the crown, the spinner may stop spinning and display one or more numbers through the one or more windows of the housing. Alternatively upon release of the crown the spinner may continue spinning until it comes to a stop on its own.

Additionally, the spinner may include a locking mechanism and a plurality of wheels or disks. Additionally, disclosed spinners may include a clicker disposed on a top, or proximal, surface of the body. The clicker may be in communication with the spinner such that applying pressure to the clicker releases the locking mechanism, allowing the spinner to spin.

In some embodiments, disclosed dice spinners may include a housing having a top portion and a bottom portion, with the top defining one or more windows. The dice spinners may further include a first spinner housed within the housing, the first spinner including: a locking mechanism, a platform disposed over a portion of the locking mechanism, and a dice disk disposed on the platform. One or more of the locking mechanism and the platform may be secured to an interior of the housing. In some embodiments, dice spinners also include a crown in mechanical communication with the locking mechanism such that applying pressure to the crown causes the locking mechanism to disengage the platform, allowing the platform and the dice disk to spin, or alternatively disengaging the platform and pushing, or forcing the dice disk to spin.

FIG. 1 illustrates a top, perspective view of a dice spinner 100 according to the present disclosure. As illustrated, the dice spinner 100 includes a housing 10, where the housing has a top portion 12 and a bottom portion 14. The top portion 12 is secured to the bottom portion 14 via screws, clips, snaps, adhesives, welding, or other appropriate securement mechanism. In some embodiments, the top portion 12 is removably secured to the bottom portion 14. The top portion 12 of the housing 10 may define one or more windows 16, such as the two windows 16 illustrated. In some embodiments, the windows 16 allow a user of the dice spinner 100 to visually see dots, circles, other indicia, etc. corresponding to numerical values. For example, a portion of disks 32, or dice disks, are visible through the one or more windows 16, where the dice disks 32 carry or bear indicia corresponding to numerical, or other, values. In this way, the dice spinner 100 can approximate or mimic a roll of dice during, for example, game play.

In some embodiments, the dice spinner 100 additionally includes a crown 20, or button. The crown 20 may be received or disposed within a void 28 defined by the top and bottom portions 12, 14 of the dice spinner 100. In some embodiments, the crown 20 has a head 22 and a body 24 that protrudes through the void 28 into an interior of the housing 10. As discussed more fully below, the crown 20 interfaces or mechanically engages with a locking mechanism, and/or spinning mechanism, housed within the interior of the housing 10.

Figure 2A:
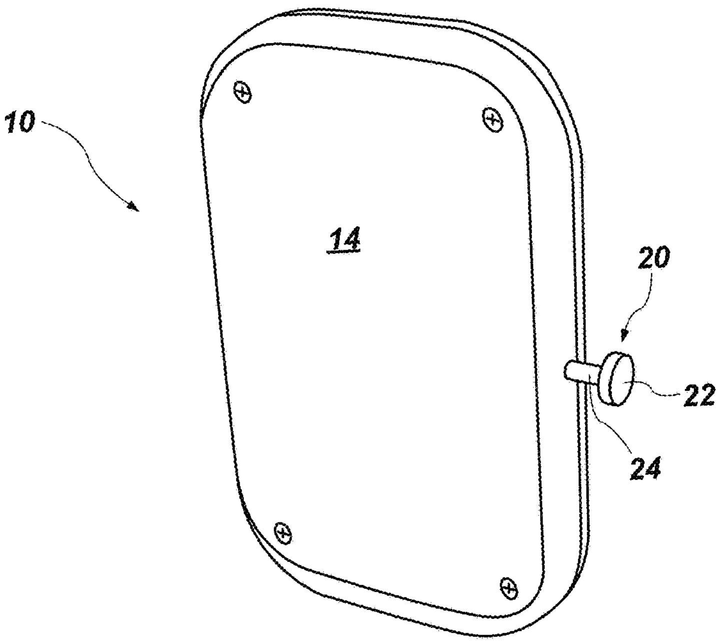
FIG. 2A illustrates a back view of the dice spinner of FIG. 1.
Figure 2B:
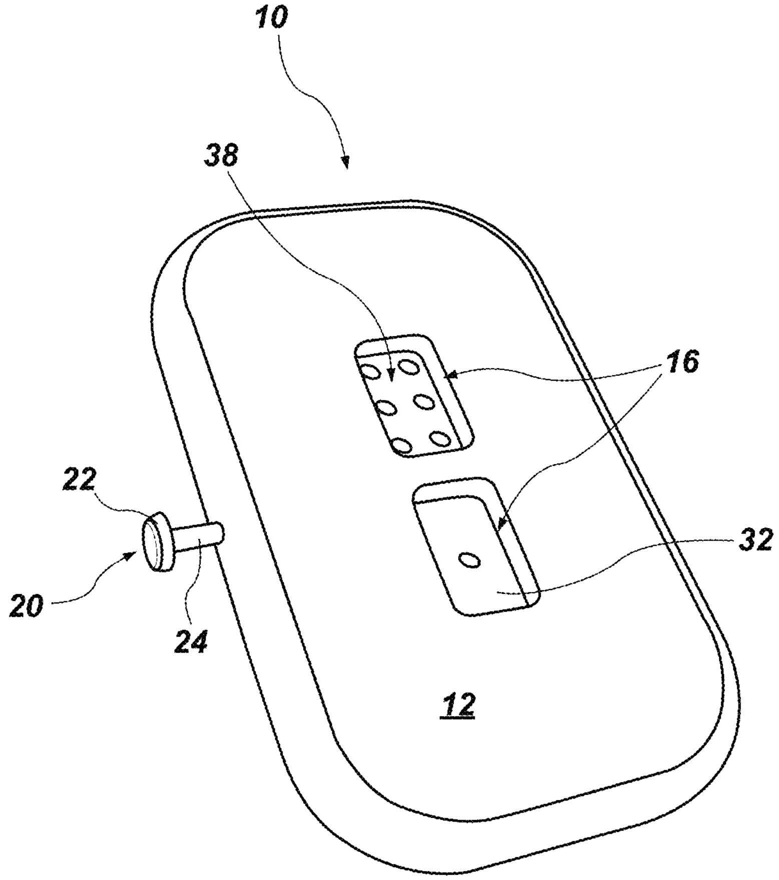
FIG. 2B illustrates a front view of the dice spinner of FIG. 1.

FIG. 2A illustrates a back view and FIG. 2B illustrates a front view of the dice spinner 100 of FIG. 1. As seen in FIG. 2A, the bottom or back portion 14 of the housing 10 may receive a plurality of screws or fasteners to secure the bottom portion 14 to the top portion 12 of the housing 10. The fasteners may reversibly secure the top portion and the bottom portion allowing a user to open the housing as needed to interchange the disks 32 as desired by a user. As seen in FIG. 2B, the top portion 12 defines one or more windows 16, through which can be seen at least a portion of the dice disks 32. As illustrated, the dice disks 32 carry dots or indicia 38 corresponding to numerical, or other game, values, in this case a one (1) and a six (6). The head 22 and body 24 of the crown 20 extend a distance from the housing 10, such that a user can manipulate the crown 20 to cause the dice disks 34 housed within the housing 10 to spin and display new numerical values. The crown 20 may be "pushed" or "twisted" in a direction to articulate the spinners and/or locking mechanism.

Figure 3:
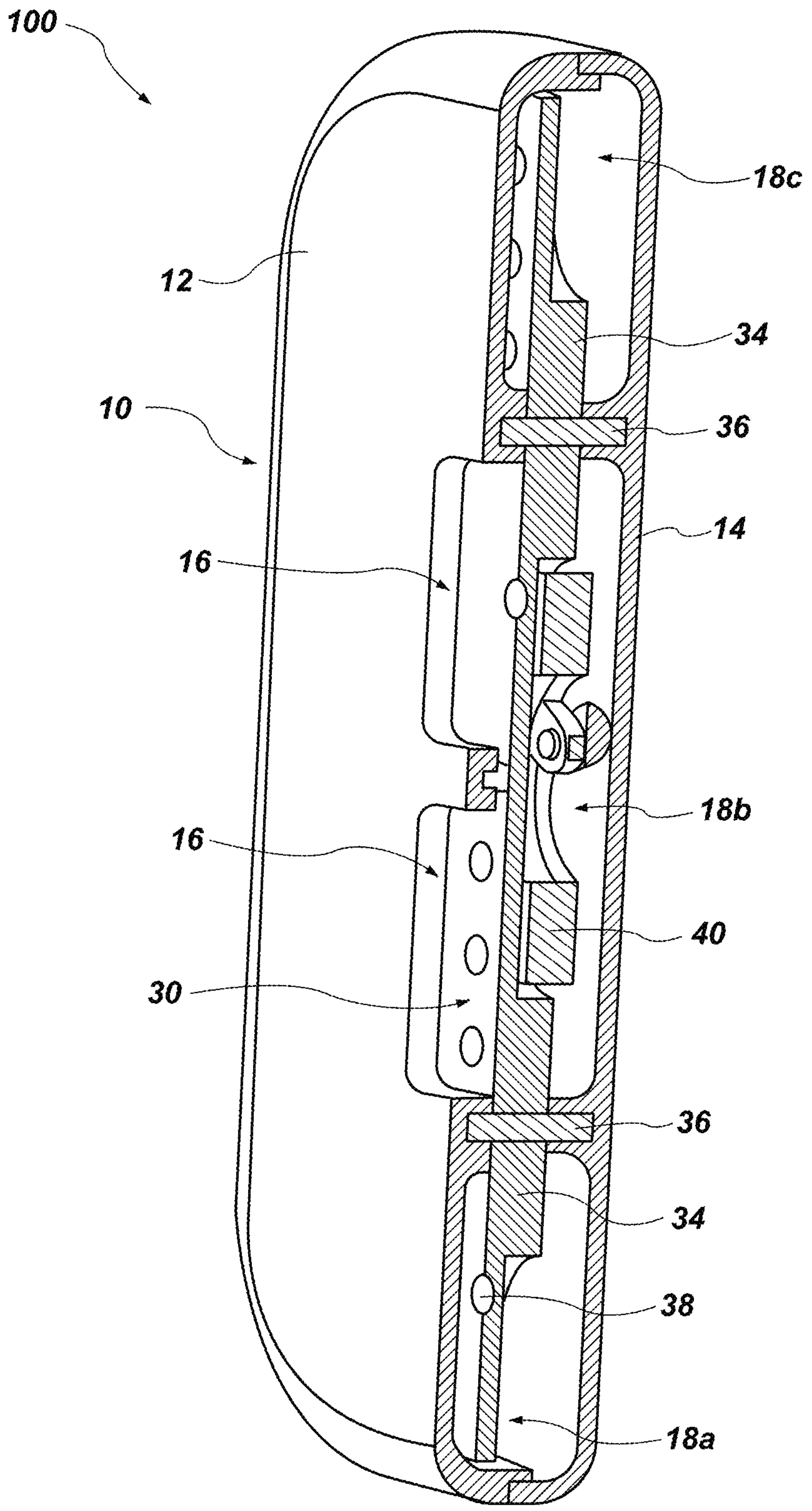
FIG. 3 illustrates a cross-sectional view of the dice spinner of FIG. 1 taken through a sagittal plane.
Figure 4:
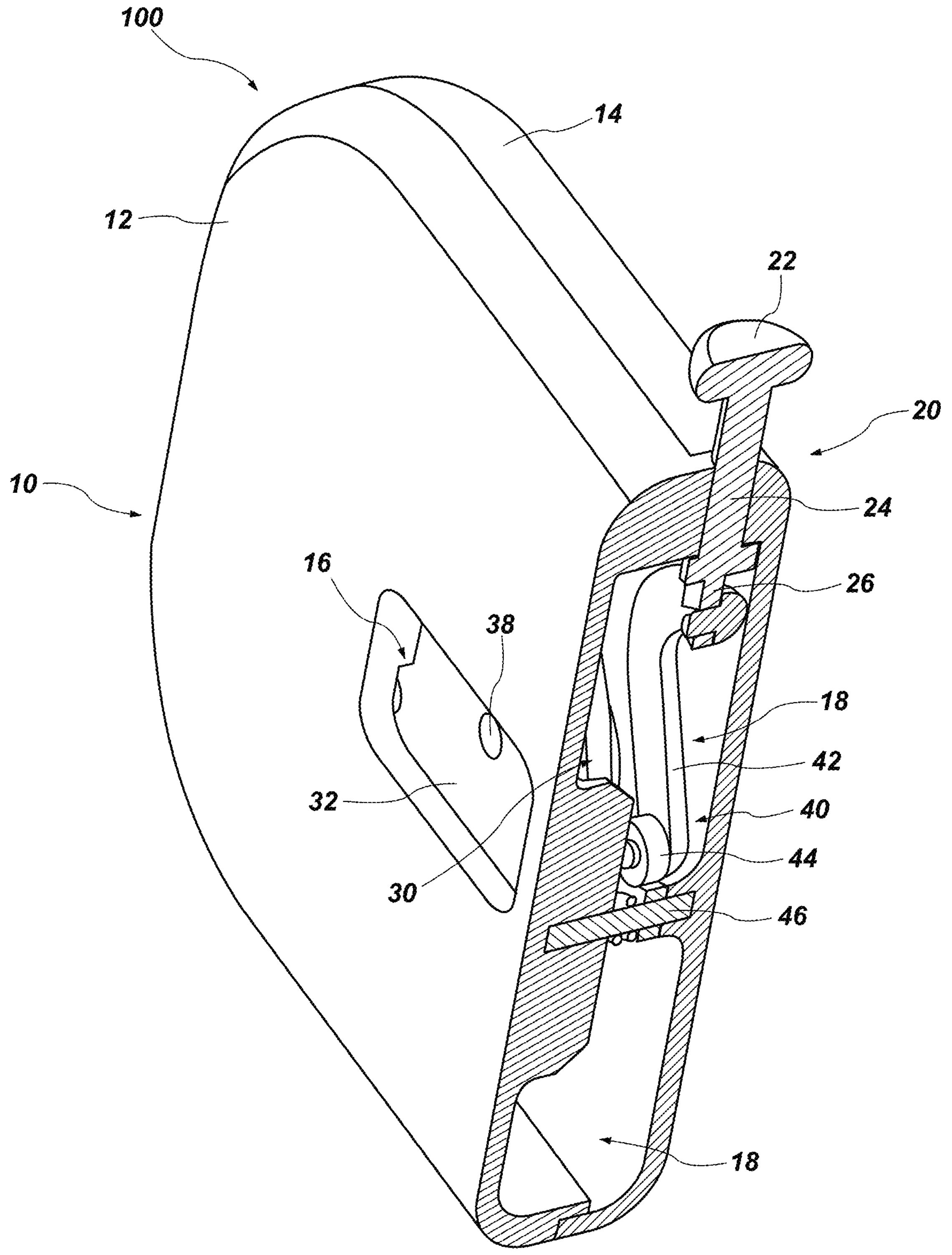
FIG. 4 illustrates a cross-sectional view of the dice spinner of FIG. 1 taken through a transverse plane.

FIG. 3 illustrates a cross-sectional view of a dice spinner 100 taken through a sagittal plane and FIG. 4 illustrates a cross-sectional view of the dice spinner 100 taken through a transverse plane. As illustrated, the top and bottom portions 12, 14 of the housing 10 defines a plurality of inner cavities 18. As illustrated in FIG. 3, the plurality of inner cavities 18, or voids, includes three (3) cavities 18. The three cavities 18 may be one large cavity or may be divided into a plurality of cavities. The plurality of cavities 18 house and/or receive a myriad of elements of the dice spinner 100. For example, a middle or center cavity **18*b* houses the locking mechanism 40 and a portion of a first spinner 30 wherein the locking mechanism 40 may include a first and second arm that may engage the first spinner 30 and a second spinner 30*a* respectively. A first cavity 18*a* may reside toward a left side of the dice spinner 100 when the dice spinner has the top portion 12, or front portion, facing up. A third cavity 18*c* may reside toward a right side of the dice spinner 100 when the dice spinner has the top portion 12 facing up. As discussed more fully below with respect to FIG. 5, the spinner 30 may include a dice disk 34. The dice disk 32 can bear indicia 38 corresponding to one or more numerical values, where the indicia 38 is visible through the one or more windows 16 defined in the top half 12 of the housing 10. Disk pivot or anchor points 36, which may be pins, may define borders of the plurality of cavities 18. The pivot points 36 may also be the point about which dice disks 32 and/or the locking mechanism 40 pivot and/or spin or rotate around the disk pivot points 36, or disk pin. In some embodiments, the locking mechanism 40 pivots about a locking pivot point 46**.

As illustrated in FIG. 4, a portion of the crown 20 extends into the housing 10. Specifically, in some embodiments, a portion of the body 24 is sandwiched between the top and bottom halves 12, 14 of the housing 10. An end 26 of the crown 20 may interface and/or mechanically engage the locking mechanism 40. The end 26 may interface with a body 42 of the locking mechanism 40 (see FIG. 5). In some embodiments, manipulation of the crown 20 causes a stopper 44 of the locking mechanism 40 to release from a dice disk 34. For example, pressure may be applied to the head 22 of the crown 20, causing the body 24 and end 26 of the crown 20 to extend further into the housing 10. Such extension may cause the stopper 44 to disengage and/or release the dice disk 32. Upon release of the stopper 44, the dice disk 32 will spin around a pivot point 36 (of FIG. 3). When the crown 20 is released, the body 24 and end 26 of the crown 20 will retract and extend away from the housing 10. Upon release of the crown 20, the stopper 44 of the locking mechanism 40 will re-engage with the dice disk 32, causing the dice disk 34 to stop spinning. When the dice disk 32 stops spinning, indicia corresponding to a numerical value will be visible through the one or more windows 16.

In some embodiments, manipulation of the crown 20 may include twisting instead of applying pressure to the crown 20. Upon twisting the crown 20, the end 26 will disengage the locking mechanism 40. Disengagement of the locking mechanism 40 by the crown 20 causes the locking mechanism 40 to release and disengage the dice disk 34. Upon release of the locking mechanism 40, the dice disk 32 will spin around a pivot point 36. When the crown 20 is twisted again (e.g., in the opposite direction), the end 26 of the crown 20 will re-engage the locking mechanism 40. Upon ren-engagement of the locking mechanism 40 by the crown 20, the locking mechanism 40 will re-engage with the dice disk 34, causing the dice disk 32 to stop spinning. When the dice disk 32 stops spinning, indicia corresponding to a numerical value will be visible through the one or more windows 16.

Figure 5:
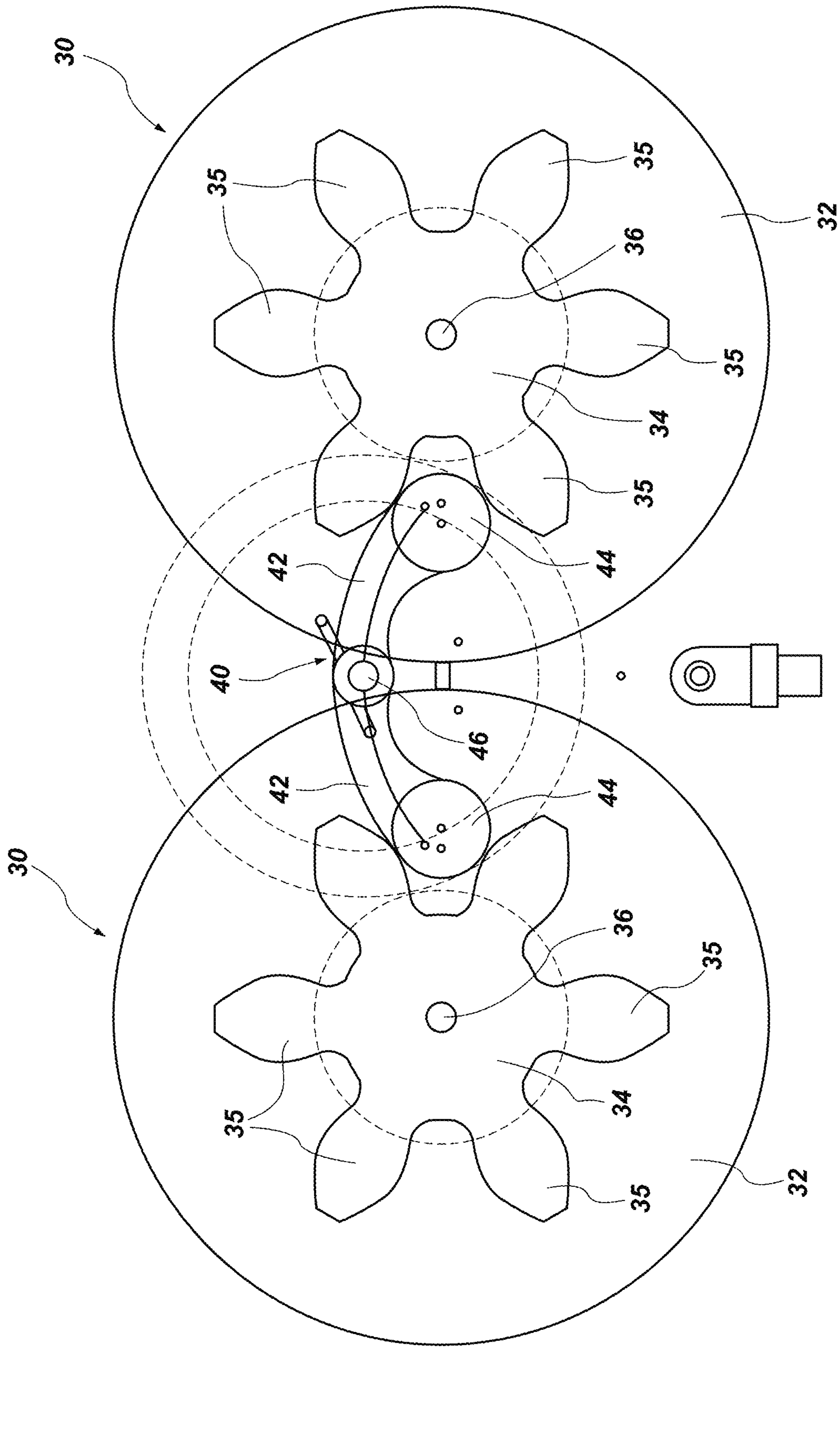
FIG. 5 illustrates an internal view of the dice spinner of FIG. 1.

FIG. 5 illustrates one embodiment of a spinner 30 according to the present disclosure. In some embodiments, the spinner 30 includes a sprocket 34, or cog and the dice disk 32. The sprocket 32 may be positioned with the housing engaging disk pin 36 on an interior of the housing 10, such as on an interior of the bottom half 14 of the housing 10 (see FIGS. 1-2B). The dice disk 32 is disposed about the sprocket 34 and secured via a pivot point 36. The sprocket 32 may be adhered to or fastened to the dice disk 32. In some embodiments, the spinner 30 additionally includes a locking mechanism 40. In some embodiments, the locking mechanism 40 is separate from the spinner 30. The locking mechanism 40 may include a body 42 and a stopper 44, where the stopper 44 engages or otherwise interfaces with the dice disk 32, ultimately engaging the sprocket 34. The locking mechanism 40 may be secured to the housing 10 via the locking pivot point 46. The locking mechanism 40 may pivot about the locking pivot point 46.

The dice disks 32 may include a plurality of wings 35, or arms, or recesses and valleys, where each wing 35 of the plurality may carry or bear indicia corresponding to a numerical value, or between each wing, or in between each wing, bears the indicia corresponding to the numerical value. Each wing 35 may be a tooth in the sprocket 34. In some embodiments, the plurality of wings 35 may include an odd number of wings. In some embodiments, the plurality of wings 35 may include an even number of wings. In some embodiments, the housing 10 may house more than one spinner 30 and the dice disks 32 of each spinner 30 may include the same number of wings 35 in the plurality. Alternatively, the dice disks 32 of each spinner 30 may include a different number of wings 35 in the plurality. Any number of wings 35, or teeth, may be utilized for any of a plurality of indicia or numerical values and thus the stopper 44 may be of any appropriate size and shape to engage the sprocket 34 to spin and lock the disks 32.

Each of the wings 36 may include a valley 37, between two wings 36, that engages the stopper 44 of the locking mechanism 40 to stop the disks 32 at a position that correlates with the indicia or numerical value.

In some embodiments, the wings 35 bear sequential indicia. Alternatively, the wings 35 may bear non-sequential and/or random indicia. In embodiments where the housing 10 houses two spinners 30, the wings 35 of each spinner 30 may bear the same indicia (sequential, non-sequential, random, etc.). In other embodiments where the housing 10 houses two spinners 30, the wings 35 of each spinner 30 may bear different indicia (e.g., different numerical values, sequential and non-sequential values, etc.).

As before, when the crown 20 is engaged (i.e., upon an application of pressure or other manipulation of the crown 20), the crown 20 causes the locking mechanism 40 to release from the dice disk 32. Specifically, manipulation of the crown 20 causes the body 42 of the locking mechanism 40 to pivot about locking pivot point 46, or locking pin, such that the stopper 44 is released from the dice disk 32. The dice disk 34 then spins about the disk pivot point 36. When the crown 20 is disengaged, or released, the locking mechanism 40 re-engages the dice disk 32, causing the dice disk 32 to stop spinning. When the dice disk 32 stops spinning, indicia 38 corresponding to a numerical value will be displayed through the one or more windows 16 defined in the top half 12 of the housing 10. Specifically, a portion of at least one disk 32, and the carried indicia, will be visible through the one or more windows 16.

In some embodiments, the dice spinner 100 houses one or more spinners 30, such as two spinners 30 as illustrated in FIG. 5. In some embodiments, the locking mechanism 40 includes two opposing bodies 42 as a unitary piece, joined at the locking pivot point 46. In some embodiments, an end of each body 42 carries a stopper 44 for engagement with a dice disk 32 and/or a sprocket 34 of the spinner 30. In some embodiments, the stopper 44 may be a rubber or silicon stopper. In some embodiments, twisting the crown 20 clockwise causes the locking mechanism 40 to release or disengage a first spinner 30 but not a second spinner 30. In some embodiments, twisting the crown 20 counterclockwise causes the locking mechanism 40 to release or disengage the second spinner 30 but not the first spinner 30. It will be further appreciated that a plurality of disks 34 are considered and thus a plurality of stoppers 44 as well as locking mechanisms 40 to engaged and disengage those discs is contemplated. In the present disclosure a single actuator 20 may be utilized or a plurality of actuators which may engage one disk 34 or a plurality of disks 34.

It will be appreciated that the spinners 30 may be in constant tension and will spin when the locking mechanism 40 is released via the crown 20. In the alternate, the spinners may be at rest and "spin" when the crown 20 is actuated "pushing" the spinners 30 in either direction, clockwise or counterclockwise, and then stopped with the crown 20 is actuated again to engage the spinners 30 as a stopper.

Additionally, a spinner may include a more vertical integration as set forth in FIGS. 6-11. In this configuration a dice spinner 200 may reside within a pen but it will be appreciated that the pen is in accessory to the dice spinner 200. Disclosed are systems, devices, and/or methods of use thereof relating to a dice spinner 200. In various aspects, these disclosed dice spinners include a body having a grip portion and a dice portion, where the dice portion defines an internal cavity and a plurality of exterior windows. The spinner may include a locking mechanism and a plurality of wheels. Additionally, disclosed dice spinner may include a clicker disposed on a top, or proximal, surface of the body. The clicker may be in communication with the spinner such that applying pressure to the clicker releases the locking mechanism, allowing the spinner to spin.

In some embodiments, disclosed dice spinners may include a body defining a first internal cavity and a plurality of external windows. The dice spinners may also include a spinner disposed and housed within the internal cavity, and a clicker disposed on a top portion of the body. The clicker may be in communication with the spinner such that applying pressure to the clicker releases a locking mechanism, allowing the spinner to spin.

Figure 7:
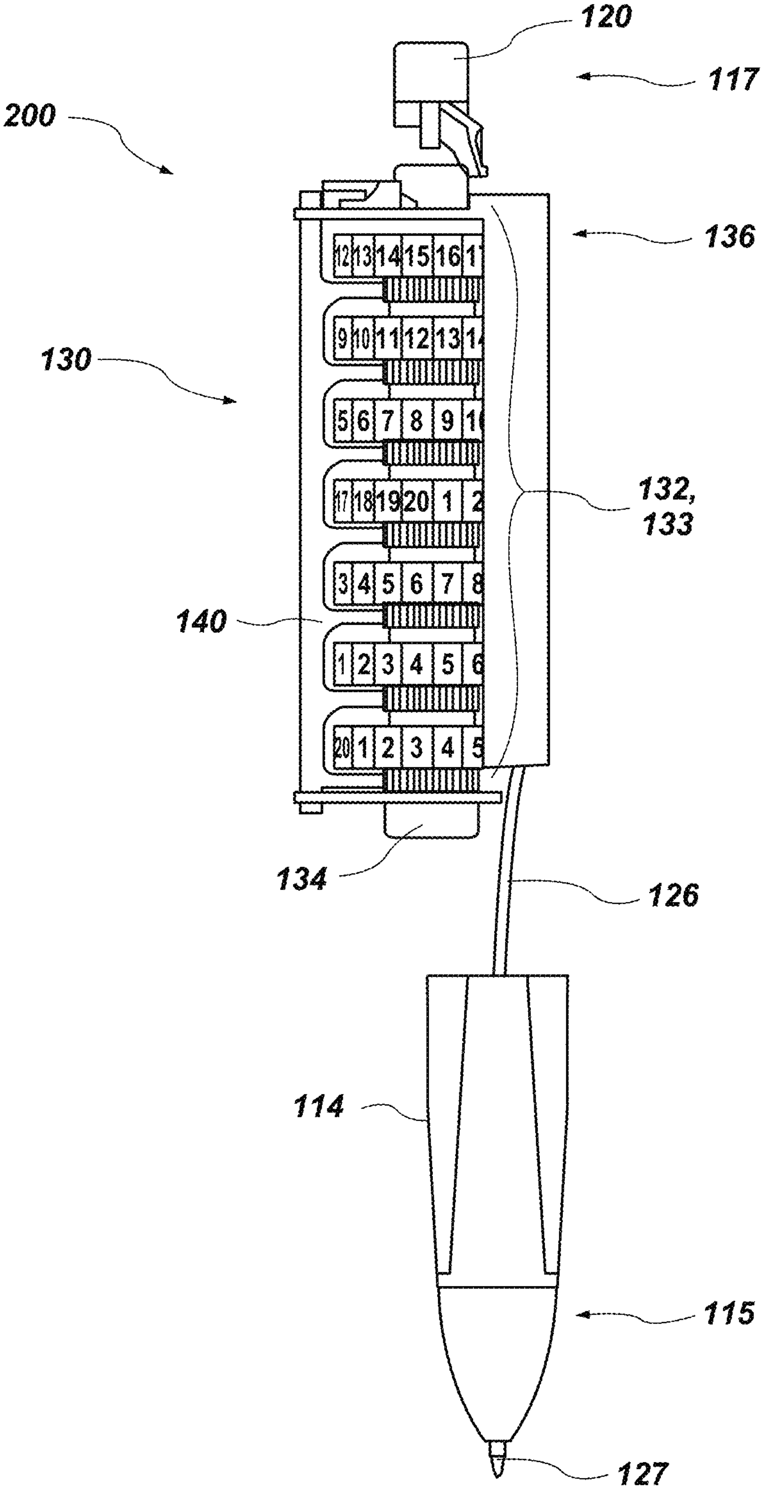
FIG. 7 illustrates a side view of internal components of the dice spinner of FIG. 6.
Figure 8:
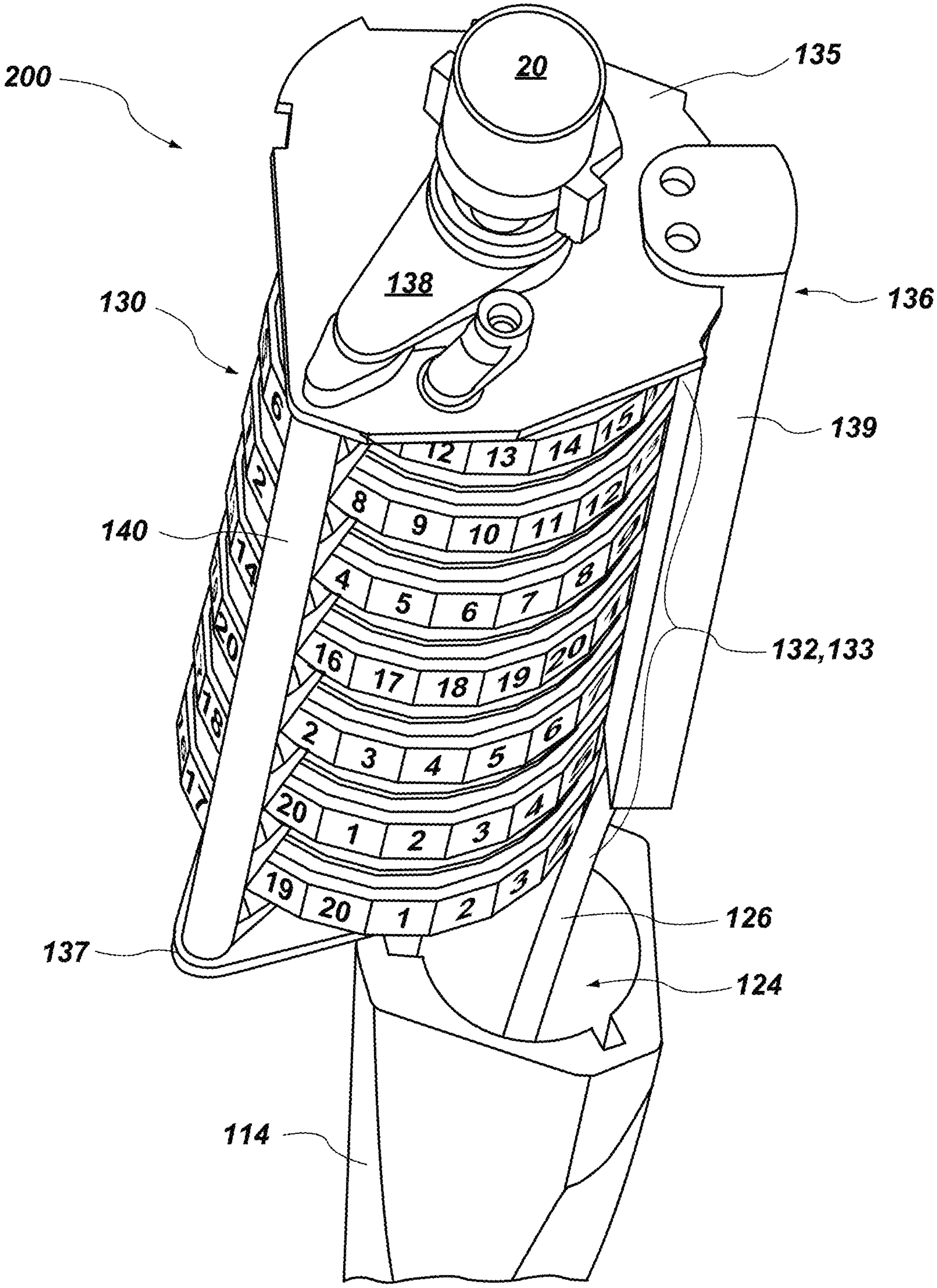
FIG. 8 illustrates a top, perspective view of the dice spinner of FIG. 7.

FIG. 7 illustrates one embodiment of a dice spinner 200 according to the present disclosure. As illustrated, the dice spinner 200 includes a body 110 having a dice portion 121 and a grip portion 114. In some embodiments, the grip portion 14 may include a grip or other padding for holding the dice spinner 200. The body 110 may also include a transition portion 118, or intermediate portion, between the dice portion 112 and the grip portion 114. The spinner 200 may additionally include a clicker 120, or button or actuator, disposed at a top or proximal end 117 of the dice spinner 200. The dice portion 112 of the body 110 defines an internal cavity 124 (see FIG. 4) and a plurality of windows 116. The plurality of windows 16 may be displayed linearly or nonlinearly. The windows 116 may be positioned on a singled side or multiple sides of the dice portion 121. In some embodiments, one or more (e.g., a plurality of) numbers may be visible through the plurality of windows 116. The one or more numbers visible through the plurality of windows 116 may approximate or mimic the results of a dice roll.

Figure 6:
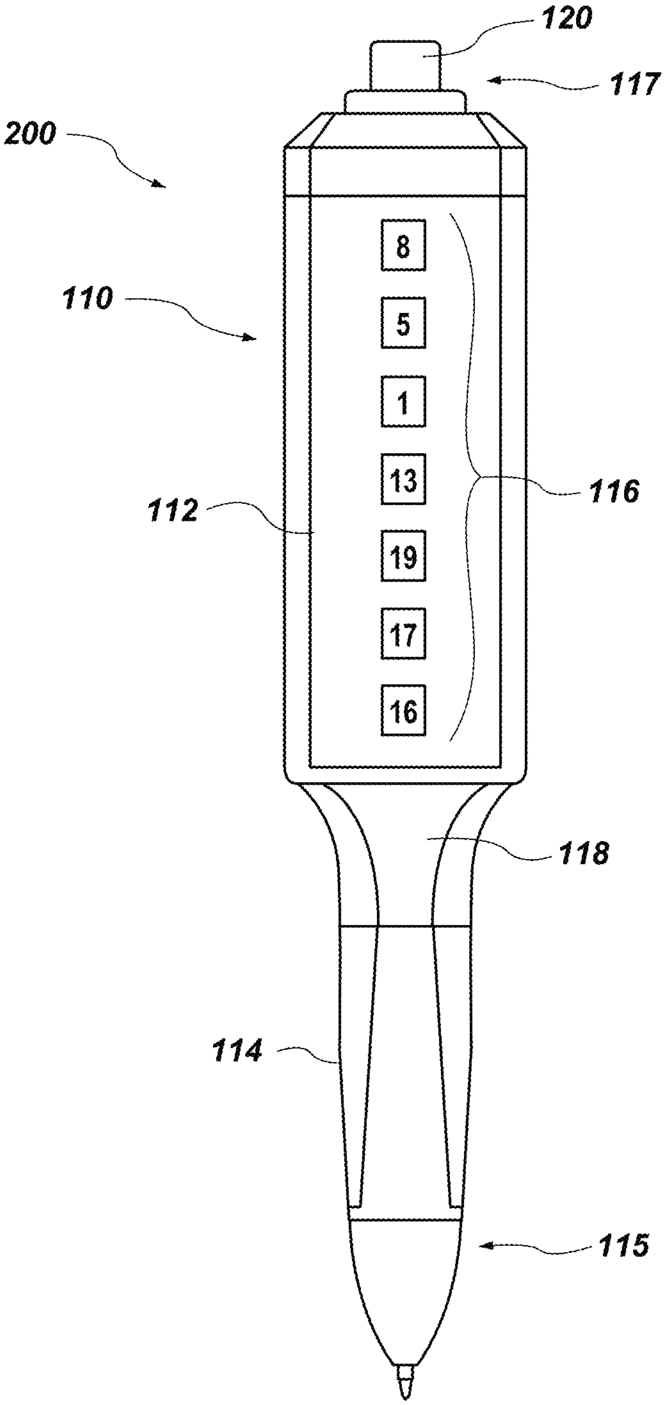
FIG. 6 illustrates an alternate embodiment of a dice spinner according to the present disclosure from a side view.

FIGS. 6 and 7 illustrate internal components of the dice spinner 200 of FIG. 6. As illustrated, the internal components include a spinner 130, spinner housing 136, a locking mechanism 140, and an ink cartridge 126 in the case of a pen being utilized. As discussed more fully below, the spinner 130, spinner housing 136, and the locking mechanism 140 are each housed or contained within the internal cavity 124 defined by the dice portion 112 of the body 110. The clicker 120 may be in communication with the locking mechanism 140 such that applied pressure on the clicker 120 causes the locking mechanism 140 to disengage from the spinner 130. One method, or a first method, of spinning the spinner 130 may be disengagement of the locking mechanism 140 causing or allowing the plurality of disks 132, or wheels, of the spinner 130 to spin. In this first method the wheels 132 and/or spinner 130 may be at tension, or constant tension such that when the locking mechanism 140 is released the spinner 130 and/or wheels 132 spin until the locking mechanism 140 is reengaged. Release of the clicker 120 (i.e., removal of applied pressure) re-engages the locking mechanism 140 with the spinner 130, such that the plurality of wheels 132 stop spinning. When the plurality of wheels 132 stop spinning, individual symbols 133, which may be numbers, will be visible through the plurality of windows 116 on the body 110. As before, the visible numbers approximate or mimic the results of a dice roll.

Alternatively, another method, or a second method, of spinning may be disengagement of the locking mechanism 140 and force applied to the wheels 132 and/or wheel spinner 130 until such time as the locking mechanism 140 is reengaged. In this second method the wheels 132 and/or spinner 130 may be at rest until acted upon by the actuator, or clicker 120. As another alternative, the spinner 130 and/or wheels 132 may spin until stopped through simple slowing down and stopping without engagement of the locking mechanism 140.

Similar to other embodiments disclosed herein, the disks 130, may include a sprocket, or wings or teeth that allows for engagement and disengagement of the locking mechanism 140.

It will be appreciated also that in any embodiment the clicker 120 may either need to be held or single click may unlock and spin, or allow to spin, the spinner 130 and/or wheels 132 with another click of the clicker 120 to reengage the locking mechanism. It is also contemplated herein that depending on the number of "dice" in the body of the dice portion 112 that individual locking mechanisms may be engaged and or disengaged with the clicker 120. Thus allowing for a specified number of clicks to individually role one die, or one wheel 132, or a plurality of dice, or wheels 132. In the alternate a mechanism is contemplated, both internal and/or external to the housing 110, that allows for locking of one wheel 132 or a plurality of wheels 132, such that when force is applied to the clicker 120 only those "unlocked" die or dice will spin.

Referring to FIG. 7, the spinner housing 136 includes a top surface 135, a bottom surface 137, a center post 134 wherein each of the disks 130 may rest on top of one another about the center post 134, and a side column 139. An anchor 138 may be disposed on the top surface 135 and may place the locking mechanism 140 in communication (e.g., mechanical) with the clicker 120. For example, referring briefly to FIG. 5, the locking mechanism 140 may include a top end 146 defining a hole or void. The anchor 138 may engage with the hole or void in the top end 146, thereby securing the locking mechanism 140 to the spinner 130 and/or the spinner housing 36. In some embodiments, the locking mechanism 140 is part of the spinner housing 136. In some embodiments, the center post 134 is disposed through a center of each of the plurality of wheels 132 much like a pin of the previous disclosed embodiment. When the plurality of wheels 132 spin, they spin around a longitudinal axis of the center post 134.

In the instance where the dice spinner 200 may be a pen, in some embodiments, the ink cartridge 126 (or a portion of the ink cartridge 126) is housed within a second internal cavity 124 defined by the narrow or grip portion 114. In some embodiments, the side column 139 defines a cavity to receive a portion of the ink cartridge 126. In some embodiments, reception of a portion of the ink cartridge 126 within the side column 139 places the ink cartridge 126 in communication with the clicker 120. Similar to the mechanical engagement with the locking mechanism 140, depression of the clicker 120 may cause a tip 127 of the ink cartridge 126 to extend from the grip portion 114 and a distal end 115 of the dice spinner 200, such that the dice spinner 200 can be used for writing. In some embodiments, selective depression or manipulation of the clicker 120 (e.g., one depression, two quick depressions, twisting, etc.) may cause the ink cartridge 126 to be deployed independently from the clicker's 120 communication with the locking mechanism 140. Concomitantly, selective depression or manipulation of the clicker 120 (e.g., one depression, two quick depressions, twisting, etc.) may cause the locking mechanism 140 to be disengaged from the spinner 130 independently from the clicker's 120 deployment of the ink cartridge 126.

Figure 9:
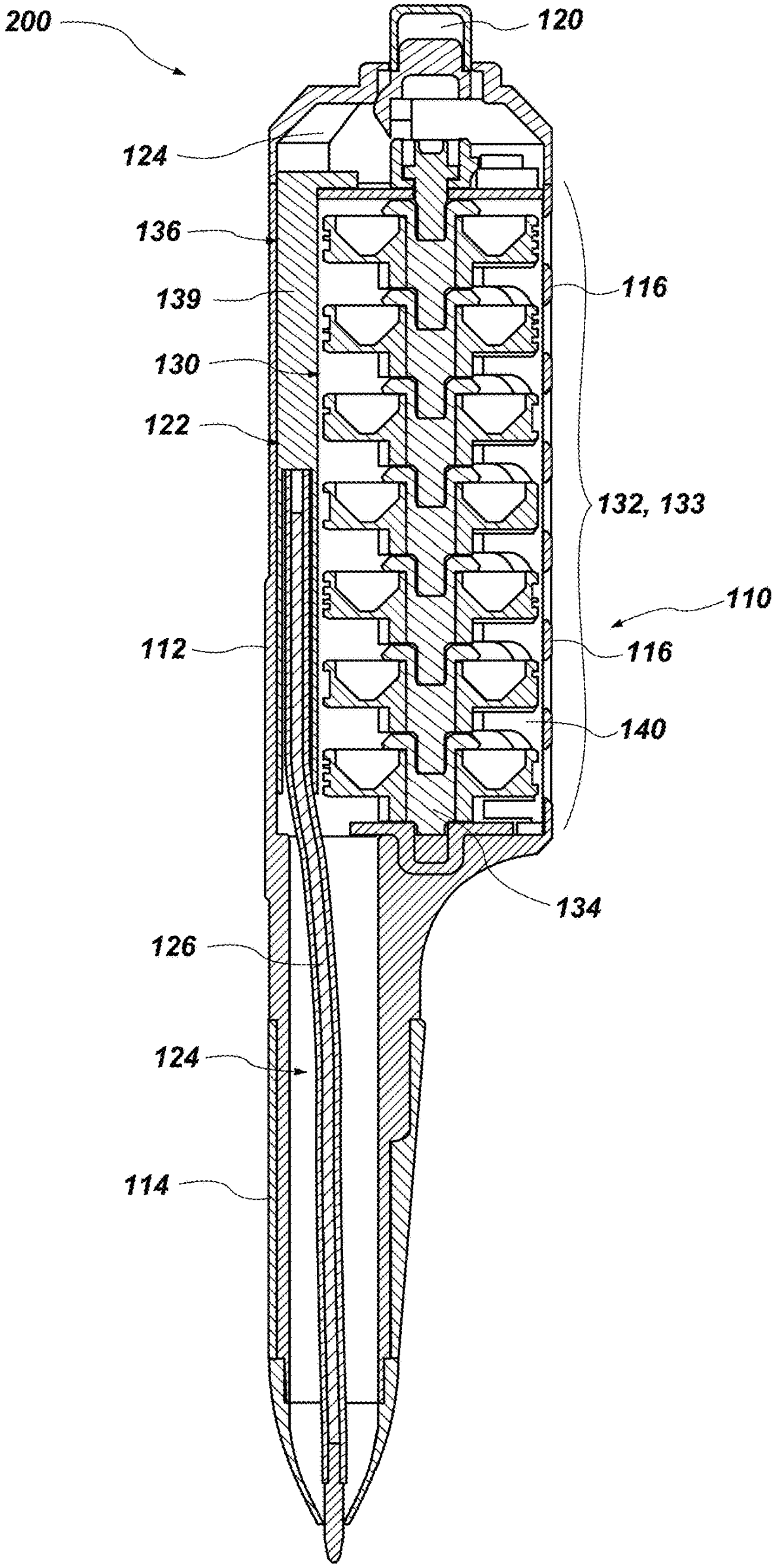
FIG. 9 illustrates a cross-sectional side view of the dice spinner of FIG. 6.

FIG. 9 illustrates a cross-sectional view of the dice spinner 200 of FIG. 6. As illustrated, the dice spinner 200 includes the body 110 with a dice portion 112 and a grip portion 114. The dice portion 112 defines an internal cavity 122 for housing the spinner 130, the spinner housing 136, and the locking mechanism 140. The dice portion 112 also defines a plurality of windows 16 (only a few windows 116 are labelled in FIG. 49; see also FIG. 1). Additional windows 16, may be positioned around the dice portion such that a plurality of numbers, from a single wheel 32, may be displayed in the separate windows 116. The grip portion 114 defines a second internal cavity 124 for housing the ink cartridge 26 (e.g., a portion of the ink cartridge 126). The clicker 120 may be disposed on a top or proximal end 117 of the body 110 and may be in mechanical communication or engagement with the locking mechanism 140.

As before, the spinner 130 includes a plurality of wheels 132 each bearing a plurality of numbers 133. In some embodiments, the plurality of wheels 132 are disposed and spin about the center post 134. The plurality of wheels 132 may bear sequential, non-sequential, and/or random sets of numbers 133. By spinning and then stopping, the plurality of wheels 132 will cause a random display of numbers 133 through the plurality of windows 116, thereby mimicking a dice roll.

Figure 10:
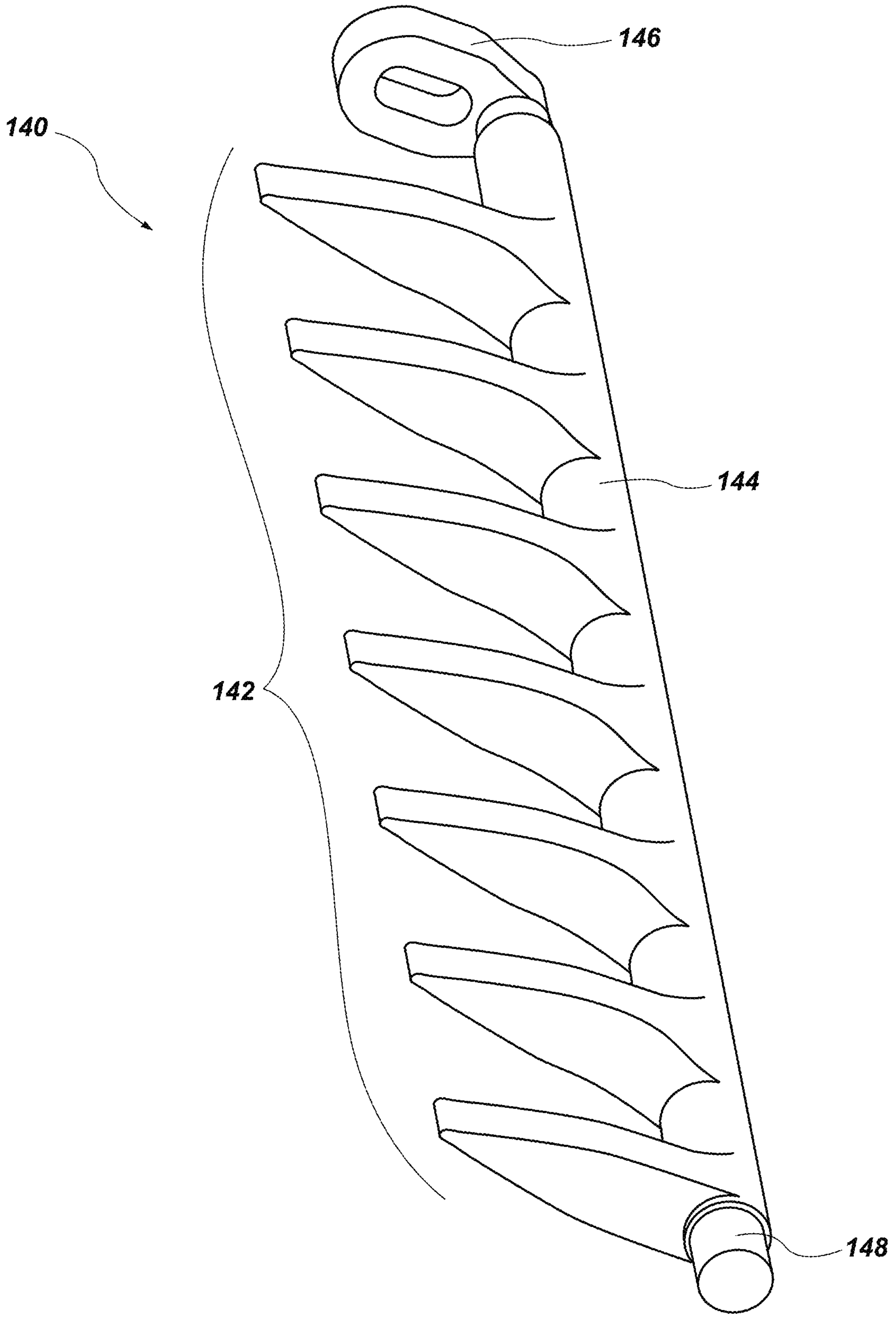
FIG. 10 illustrates one embodiment of a locking mechanism of the dice spinner of FIG. 6, according to the present disclosure.

FIG. 10 illustrates the locking mechanism 140 according to the present disclosure. As illustrated, the locking mechanism 140 includes a body 144 having a top end 146 and a bottom end 148. A plurality of teeth 142 extend between the top and bottom ends 146, 148. In some embodiments, each tooth of the plurality of teeth 142 engages (e.g., mechanically engages) one wheel of the plurality of wheels 132 of the spinner 130 (see FIGS. 7-8) much like, or similar to, engaging the sprocket 34 and wings 35 as set forth previously herein. When the teeth 142 are engaged with the plurality of wheels 132, movement of the wheels 132, such as spinning, is prevented. When the teeth 142 are disengaged, the wheels are allowed to move, such as by spinning. Upon re-engagement of the wheels 132 by the teeth 142, movement of the wheels is stopped. When the wheels 132 have stopped spinning, one of the plurality of numbers 133 on each of the wheels 132 will be visible through each of the plurality of windows 116 (see FIG. 1). In this way, the dice spinner 200 mimics the rolling or throwing of dice pieces by a player to determine that player's next move, strike, accuracy, etc.

In some embodiments, the locking mechanism 140 is incorporated as part of the spinner housing 136 (see FIGS. 2-3). In some embodiments, the locking mechanism 140 is part of the spinner 130.

Figure 11A:
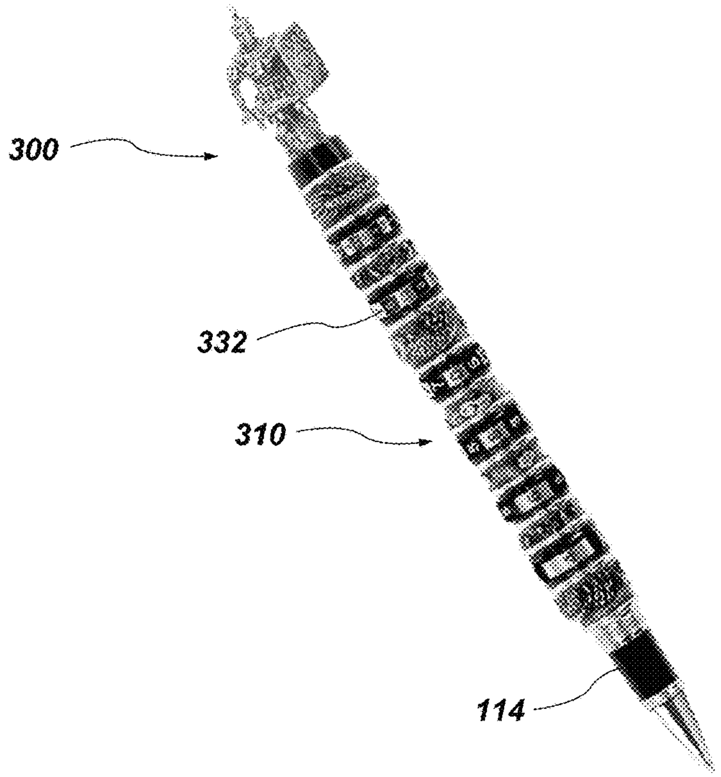
FIGS. 11A and 11B illustrate additional embodiments of a dice spinner, which may be a pen, according to the present disclosure.
Figure 11B:
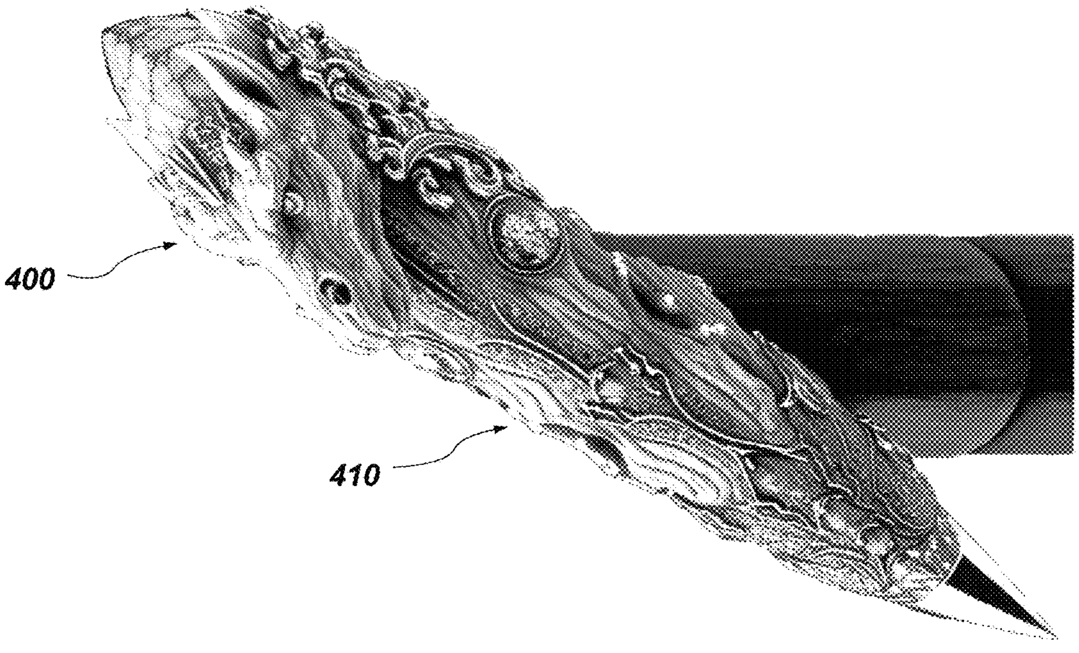

FIGS. 11A and 11B illustrate additional embodiments of a dice spinner 200 according to the present disclosure. Specifically, FIGS. 11A and 11B illustrate dice spinners, where a body has a worked and ornamented exterior. For example, FIG. 11A illustrates a dice spinner 300 having a body 310 that includes elements of the spinner 130 (i.e., plurality of wheels 132 each bearing a plurality of numbers 133). In some embodiments, other elements of the spinner 130 (e.g., the spinner housing) and/or the locking mechanism 140 may still be housed within an internal cavity defined by a body 310. The clicker 120 may also be worked and ornamental, such as being a character or creature.

In these alternate embodiments a wheel 332 may, again, be at tension or at rest. For example, referring to FIG. 11A, the entirety of the wheels 332 may be displayed on an exterior of a pen 300 or other longitudinal member. The wheels 332 may be read down the longitudinal line of the pen at a point specified on the pen, with a notch, arrow, or the like. The wheels 332 may manually spin by a user, such as using an individual's fingers or hands to spin the wheels 332. The pen 300 may include a clicker and a locking mechanism wherein applying pressure to the clicker disengages the locking mechanism so a user may manually spin the wheels 332. Once the pressure is no longer applied to the clicker the wheels 332 discontinued spinning and may be "locked" at the specified location. Similar to the disclosure above, one click may release the locking mechanism and another click reengages the locking mechanism. Alternatively, spinning the wheels 332 may include no locking mechanism and the wheels spin until rotational momentum simply comes to halt on its own, without external force from the user.

As shown in FIG. 11B, the exterior of the body 410 of the spinner 400 may be worked in the design of an animal or creature-either real or imaginary (e.g., dragons). In some embodiments, the worked design of the body 410 corresponds to the type of game being played using the spinner 200 100 (e.g., D&D, Magic The Gathering®, Monopoly®, etc.). In some embodiments, the worked design of the body 10 includes gems, metal working, wood working, molded plastic, rhinestones, and other appropriate decorative elements.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination.

In one embodiment, the terms "about" and "approximately" refer to numerical parameters within 10% of the indicated range. The terms "a," "an," "the," and similar referents used in the context of describing the embodiments of the present disclosure (especially in the context of the following claims) are to be construed to cover both the singular and the plural, unless otherwise indicated herein or clearly contradicted by context. Recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein is intended merely to better illuminate the embodiments of the present disclosure and does not pose a limitation on the scope of the present disclosure. No language in the specification should be construed as indicating any non-claimed element essential to the practice of the embodiments of the present disclosure.

Groupings of alternative elements or embodiments disclosed herein are not to be construed as limitations. Each group member may be referred to and claimed individually or in any combination with other members of the group or other elements found herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

Any combination of the above-described elements in all possible variations thereof is encompassed by the present disclosure unless otherwise indicated herein or otherwise clearly contradicted by context.

Although this disclosure provides many specifics, these should not be construed as limiting the scope of any of the claims that follow, but merely as providing illustrations of some embodiments of elements and features of the disclosed subject matter. Other embodiments of the disclosed subject matter, and of their elements and features, may be devised which do not depart from the spirit or scope of any of the claims. Features from different embodiments may be employed in combination. Accordingly, the scope of each claim is limited only by its plain language and the legal equivalents thereto.

What is claimed:

1. A dice spinner comprising:

a housing comprising a top and a bottom, the top defining one or more windows;

a spinner housed within the housing, the spinner comprising:

a locking mechanism comprising:

two opposing bodies as a unitary piece, a single pivot point, the two opposing bodies each directly connected to the single pivot point, a first stopper positioned at an end of one of the two opposing bodies, the first stopper extending along a same curvature as the two opposing bodies, a second stopper positioned at an opposite end of the two opposing bodies from the first stopper, the second stopper extending along the same curvature as the two opposing bodies; and at least one dice disk; and a crown in mechanical communication with the two opposing bodies of the spinner such that applying pressure to the crown causes the locking mechanism to pivot about the pivot point and release the first stopper and the spinner to spin and display one or more numbers through the one or more windows of the housing.

2. The dice spinner of claim 1, wherein the spinner further comprises a sprocket, the sprocket and disk fastenably engaged to each other disposed on a portion of the locking mechanism.

3. The dice spinner of claim 1, wherein the at least one dice disk comprises a plurality of dice disks.

4. The dice spinner of claim 1, wherein the at least one dice disk comprises a sprocket with teeth to engage the locking mechanism, wherein the at least one dice disk comprises indicia corresponding to a number between each tooth or at each tooth of the dice disk.

5. The dice spinner of claim 4, wherein the indicia comprises dots.

6. The dice spinner of claim 1, wherein the crown is in mechanical communication with the locking mechanism of the spinner.

7. The dice spinner of claim 1, wherein the at least one dice disk comprises a plurality of dice disks and each stopper of the locking mechanism is in contact with a platform of the dice disks, thereby preventing movement of the dice disks.

8. The dice spinner of claim 1, wherein the top and bottom of the housing are continuous with each other.

9. The dice spinner of claim 1, wherein the top and bottom of the housing are removably attached to each other.

10. A dice spinner comprising:

a housing comprising a top portion and a bottom portion, the top portion defining one or more windows;

a first spinner housed within the housing, the spinner comprising a locking mechanism comprising:

a body comprising two ends, a single pivot point, a first stopper positioned at a first end of the two ends of the body and extending along a same curvature as the body and a second stopper positioned opposite the first end at a second end of the two ends of the body and extending along the same curvature as the body, a platform disposed over a portion of the locking mechanism, and a dice disk disposed on the platform; and a crown in mechanical communication with the body of the locking mechanism such that applying pressure to the crown causes the locking mechanism to pivot about the single pivot point and release the first stopper and to disengage the platform, allowing the platform and the dice disk to spin.

11. The dice spinner of claim 10, wherein releasing pressure from the crown causes the locking mechanism to re-engage the platform, such that the platform and the dice disk stop spinning and display one or more numbers through the one or more windows of the housing.

12. The dice spinner of claim 10, wherein the crown comprises an external head, a body, and an internal end opposite the external head, the internal end being in mechanical communication with the locking mechanism.

13. The dice spinner of claim 10, further comprising a second spinner housed within the housing adjacent to the first spinner.

14. The dice spinner of claim 13, wherein the first stopper engages the first spinner at the first end and the second stopper engages the second spinner at a second end; and wherein the pivot point is positioned between the first spinner and the second spinner and the pivot point comprises a pin engaged to the housing and to the first and second stoppers.

15. The dice spinner of claim 10, wherein the body of the locking mechanism comprises two portions, a first portion for anchoring the locking mechanism to the housing at the pivot point and placing the locking mechanism in communication with the crown, and a second portion including the first stop per for engaging the platform.

16. The dice spinner of claim 10, wherein the dice disk comprises one or more winged portions engaged to a disk; and wherein each of the one or more wings, or between each of the one or more wings there is an indicia corresponding to a number.

17. The dice spinner of claim 16, wherein the dice disk comprises an even number of wings.

18. The dice spinner of claim 16, wherein the dice disk comprises an odd number of wings.

19. The dice spinner of claim 16, wherein the indicia of the dice disk comprises dots, diamonds, squares, or numerals.

* * * * *